Oct. 20, 1942.　　　　O. S. PETERS　　　　2,299,425
OSCILLATOR
Filed July 30, 1940　　　3 Sheets-Sheet 2

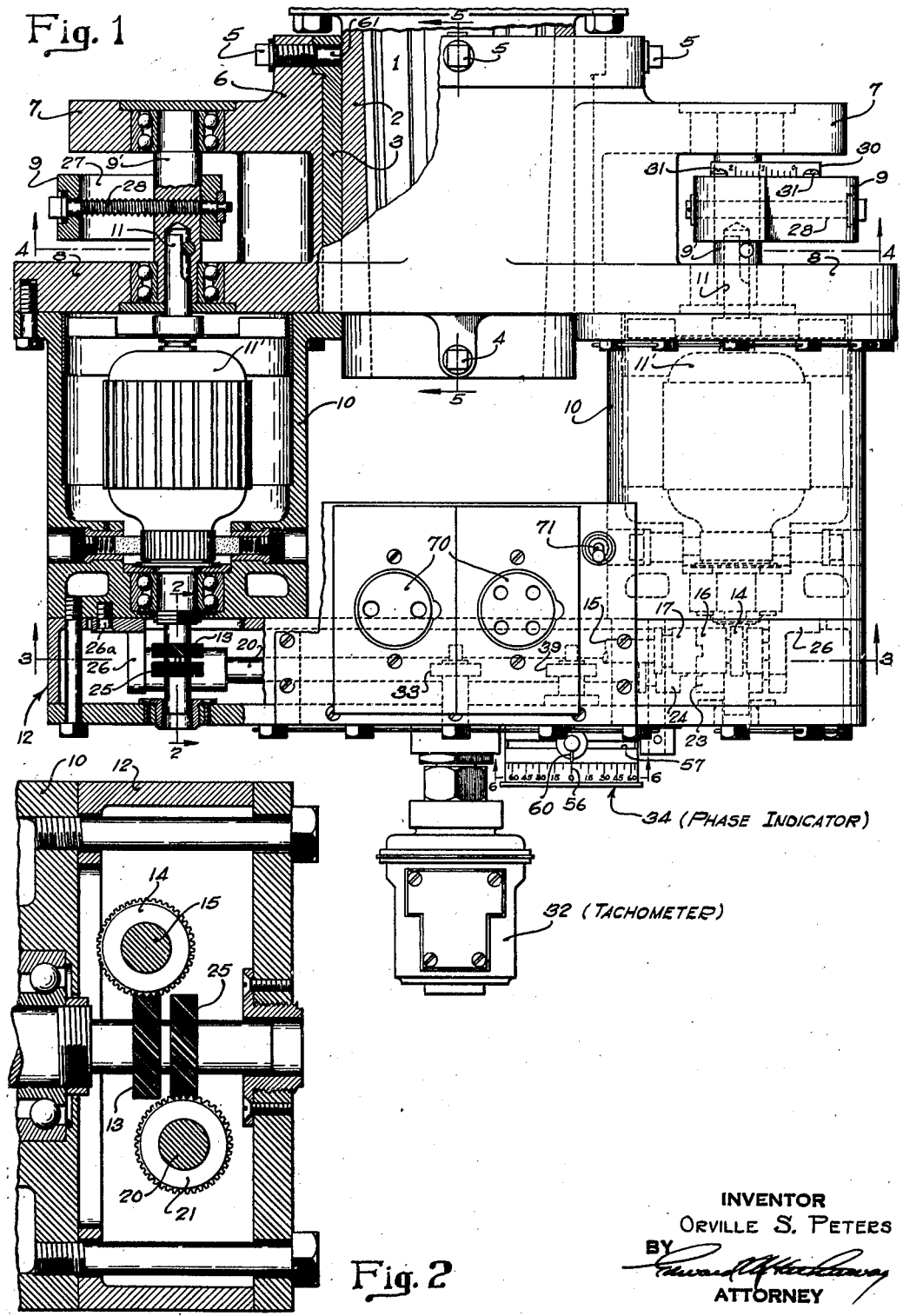

INVENTOR
ORVILLE S. PETERS
BY
ATTORNEY

Oct. 20, 1942

O. S. PETERS 2,299,425

OSCILLATOR

Filed July 30, 1940

INVENTOR
ORVILLE S. PETERS
BY
ATTORNEY

Patented Oct. 20, 1942

2,299,425

UNITED STATES PATENT OFFICE 2,299,425

OSCILLATOR

Orville S. Peters, Chevy Chase, Md., assignor to The Baldwin Locomotive Works, a corporation of Pennsylvania Application July 30, 1940, Serial No. 348,602

12 Claims. (Cl. 73—51)

This invention relates generally to apparatus for testing physical characteristics of structures or specimens and more particularly to an improved oscillator for applying a vibratory force to the structure especially of an airplane.

Airplanes are subject to vibrations created by dynamic unbalance in the engine or propeller and at times this vibration may be of such a period as to set up a serious resonant vibration within the airplane wing or other part of the plane structure or in the event of a mishap to the engine or propeller the unbalanced forces may become destructive. While my invention is particularly applicable to airplane study, yet it is also applicable in certain aspects to other types of structures.

It is an object of my invention to provide an improved oscillator apparatus for artificially applying vibratory forces to a structure. A further object is to provide an improved apparatus for measuring the phase relation between the applied force and the vibration actually set up in the structure.

Another object is to provide an improved oscillator apparatus for applying a variable vibratory force to a structure and more specifically it is an object of my invention to provide an improved structure adapted to apply the vibrating force directly to the propeller shaft of an airplane engine.

A still further object is to provide an improved vibration testing apparatus that is relatively compact and is simple in construction, operation and maintenance, together with having a high degree of ruggedness combined with accessibility of parts as well as flexibility of control and of application to a structure to be tested.

Other objects and advantages will be more apparent to those skilled in the art from the following description of the accompanying drawings in which:

Fig. 1 is a plan view of my improved apparatus applied to the nose end of an airplane propeller shaft, parts being broken away to show details of construction;

Fig. 2 is a longitudinal section taken substantially on the lines 2—2 of Figs. 1 and 3;

Figure 3:
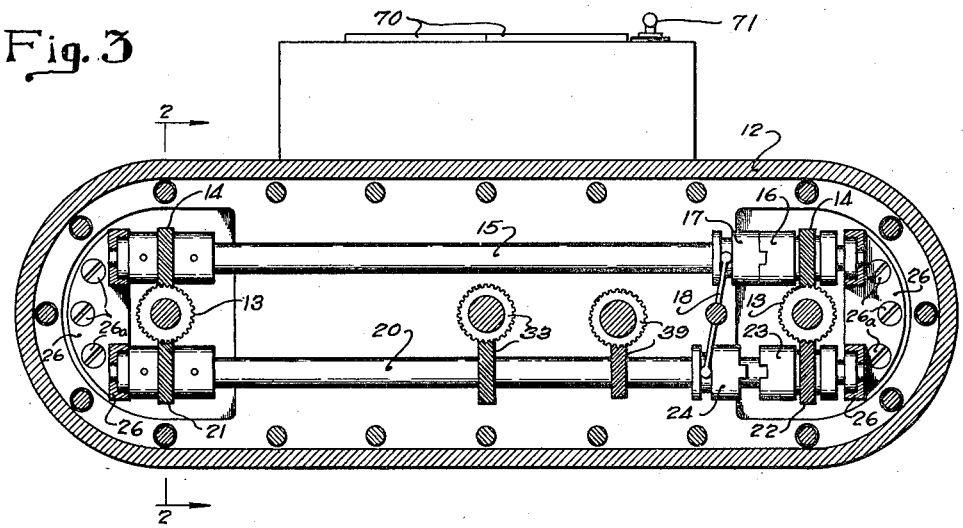
Fig. 3 is a transverse section taken on the line 3—3 of Fig. 1.

In the particular embodiment of the invention such as is disclosed herein merely for the purpose of illustrating one specific form among possible others that the invention might take in practice, as well as illustrating one specific type of structure that may be tested, I have shown my improved oscillator apparatus mounted upon the nose end of an airplane propeller shaft 1. Any suitable adapter arrangement having sleeves 2 and 3 may be splined to the propeller shaft and suitably anchored thereto by a series of radial screws 4 and 5. The frame of my oscillator apparatus consists of a hub 6 having on each side a pair of arms 7 and 8, the respective pairs being on directly opposite sides of the hub. Inasmuch as the apparatus is symmetrical about each side of the hub axis, the description for one side will suffice for both and corresponding parts are given the same reference number. The vibrating means includes a pair of revolving eccentric weights 9 adjustably supported upon a shaft 9' which is journalled in the arms 7 and 8, the weights revolving in a plane close to the inner end of the oscillator frame thereby insuring effective transmission of vibrations to the shaft. Specifically the plane of revolution intersects the shaft. An electric motor housing 10 is secured as by bolts to arm 8 and the armature shaft 11 is preferably received within a bore of shaft 9' and secured thereto to drive the same. The outer end of the armature shaft extends into a suitable housing generally indicated at 12 which extends across the front of the apparatus and connects the outer ends of the two motor housings 10, 10.

It is necessary to have the two eccentric weights 9, 9 driven in a predetermined angular relation to each other and to accomplish this I provide a pair of gears 13, 13 secured to the respective motor shafts and meshing with a pair of identical spiral gears 14 one of which is secured to shaft 15 while the other, as shown in Fig. 3, is secured to one-half of a positive clutch 16. This clutch may be connected or disconnected to shaft 15 by a clutch collar 17 operated in any suitable manner as by a pivotal shifting arm 18 operated from a point externally of housing 12. The gears and shaft 15 just described insure rotation of the two motors and weights in the same direction. However, it is some times desirable to rotate the weights oppositely to each other. This is accomplished by reversing the usual electric connections to the two motors and by connecting the two motor shafts through oppositely cut spiral gears 21 and 22 mounted respectively on shaft 20 or on one element 23 of a clutch which may be secured to shaft 20 through a shifting clutch element 24. The gears 21 and 22 mesh with gears 25 secured on the respective motor shafts. Shifting of clutch lever 18 throws either clutch 17 or 24 into engagement while disconnecting the other clutch or the two clutches may be simultaneously disconnected to allow relative angular adjustment between the weights. The two shafts 15 and 20 are mounted in suitable brackets 26 which are secured by screws 26a to the outer end of motor housing 10.

Figure 4:
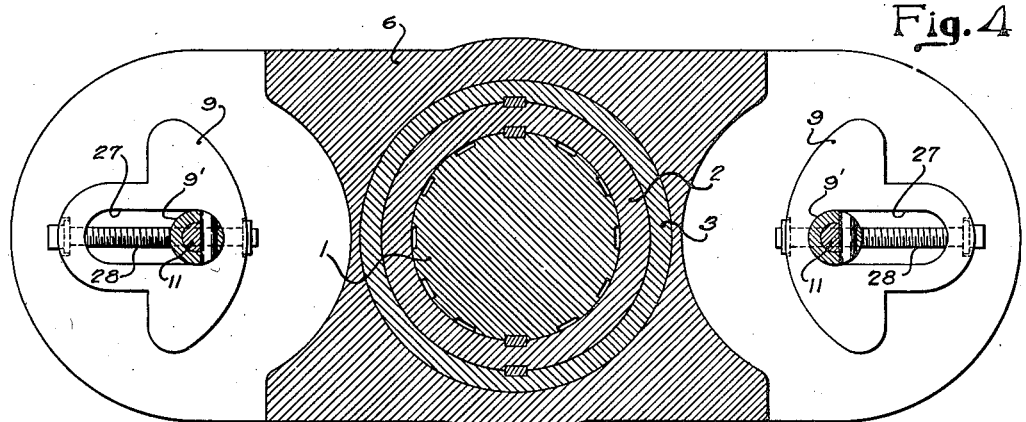
Fig. 4 is a transverse section taken on the line 4—4 of Fig. 1.
Figure 5:
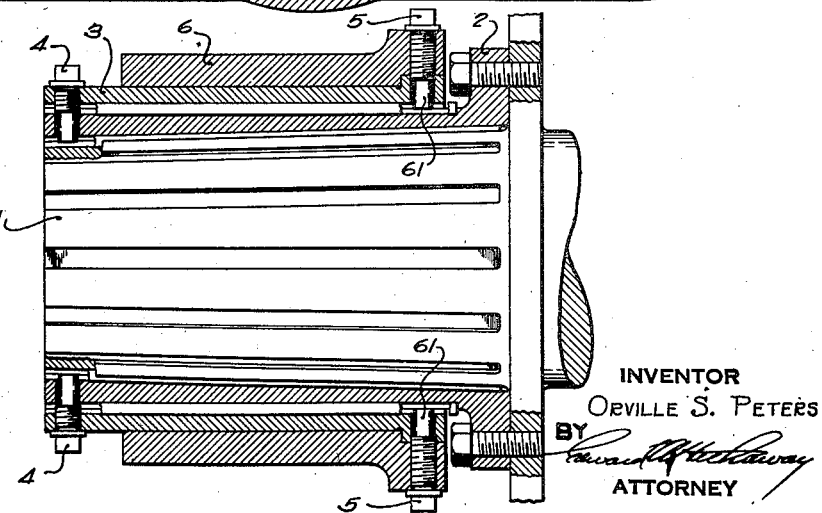
Fig. 5 is a longitudinal section taken on the line 5—5 of Fig. 1.

To adjust the eccentricity of the weight from zero to maximum, the weight has, as shown in Fig. 4, a radial slot 27 through which shaft 9' extends. An adjusting pin 28 has its ends journalled in the weight and is threaded through the shaft. A squared end of the screw permits rotation and axial movement of the screw through shaft 9' and accordingly shifts weight 9. As shown in Fig. 4, the weight is so shaped that it may be adjusted from a zero position of eccentricity to a maximum, while the clutches 17 and 24 permit the weights to be operated in a positive angular relation either in the same direction or in opposite directions. To determine the degree of eccentricity of the weights a small scale 30, Fig. 1, may be secured to the side of the weight by screws 31. A suitable mark on the shaft will permit adequate indication on the scale of the degree of eccentricity.

To determine the speed of operation a tachometer diagrammatically indicated at 32, Fig. 1, may be supported on the front of casing 12 and driven by spiral gears 33, Fig. 3, connected to shaft 20 which will always be positively driven through gears 21 even though clutch element 24 is disengaged.

Figure 7:
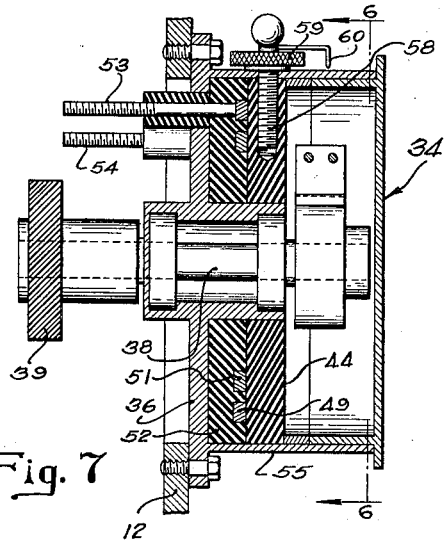
Fig. 7 is a section taken on the line 7—7 of Fig. 6.
Figure 6:
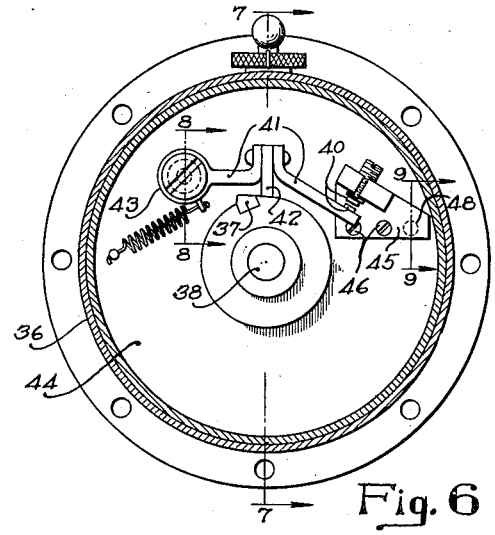
Fig. 6 is a transverse section taken on the line 6—6 of Figs. 1 and 7.
Figure 8:
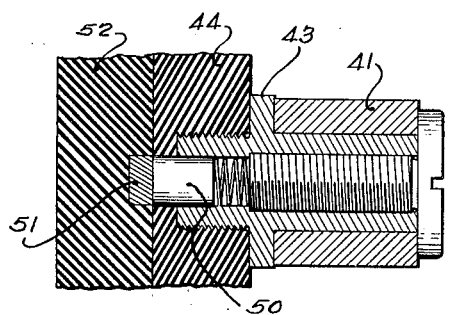
Fig. 8 is a section on line 8—8 of Fig. 6.
Figure 9:
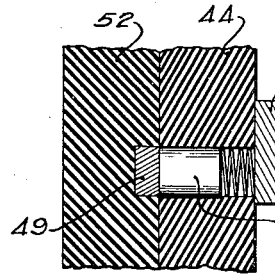
Fig. 9 is a section on line 9—9 of Fig. 6.

An improved phase indicating device generally indicated at 34, Fig. 1, is adapted to determine the angular phase relation between the applied force and the resultant vibratory force set up in the structure or specimen under test. This device comprises, as shown in Figs. 6 and 7, a housing 36 secured to the front of housing 12 and having a cam 37 mounted upon a shaft 38 which is driven through a pair of spiral gears 39 from the transverse synchronizing shaft 20, Fig. 3. This cam causes closure of a pair of contacts 40, Fig. 6, the movable lower contact being formed on a pair of arms 41 between which a dependent cam follower 42 is secured to constitute an integral part of the arm structure. This arm is pivoted as at 43 to a rotatably shiftable insulating disc 44 as shown in Fig. 8. The upper stationary element of contacts 40 is adjustably mounted in a suitable bracket 45 which, in turn, is rigidly secured by screws 46 to the adjustable disc 44. The bracket 45, as shown in Fig. 9, is electrically connected through a brush 48 to a slip ring 49, while the movable contact arm 41 is, as shown in Fig. 8, electrically connected through a brush 50 to a slip ring 51. These two slip rings are embedded in a stationary insulation base 52. A pair of terminals 53 and 54 are secured to the rings 49 and 51 for connection to an oscillograph to be mentioned later. The casing 36 has a circular wall 55, Fig. 7, provided with graduations 56, Fig. 1, upon its outer surface. The circular wall also has, as shown in Fig. 1, a circumferential slot 57 which extends approximately 180° around the wall. As shown in Fig. 7, a screw 58 threaded in disc 44 extends outwardly through slot 57 and is held in any angularly adjusted position of disc 44 by a lock nut 59; a pointer 60 on screw 58 extends to the graduations 56. The operation of this device is described below.

A suitable electrical plug box 70 and motor starting switch 71 are mounted on top of housing 12.

Figure 11:
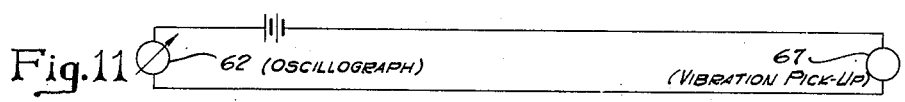
Fig. 11 is a simplified diagram for determining the vibration created in the structure.
Figure 10:
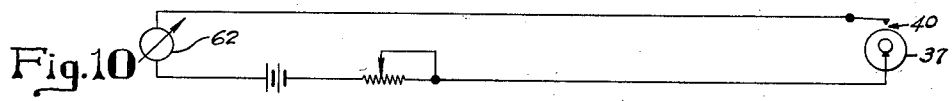
Fig. 10 is a simplified wiring diagram for determining the applied vibratory force.
Figure 12:
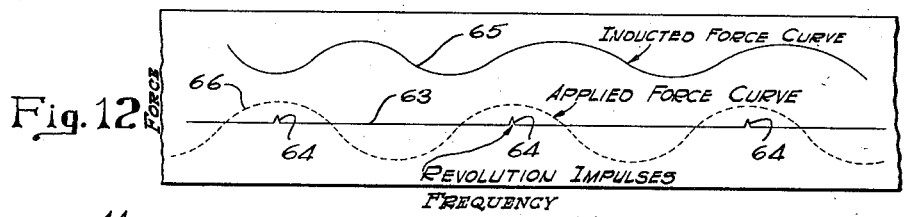
Fig. 12 is a chart diagrammatically illustrating the relationship of the applied force and resultant force.

*Operation.*—The apparatus is initially placed upon the propeller shaft or other structure, Fig. 1, and the weights 9 are adjusted with any desired degree of eccentricity by the screws 28, whereupon simultaneous rotation of the motor armatures 11' causes the weights to rotate in the same direction, or in opposite directions as may be required for any particular test. When the weights rotate in opposite directions the force is in a vertical direction whereas if the rotation of the two weights is identical the force is in torsion. In changing from opposite to identical rotation one of the weights is rotated 180° which may be done by releasing both clutches 17 and 24. For opposite rotation the weights both point up or down as the case may be, whereas for identical rotation one points up and the other down. Also, if it is desired to angularly shift the entire apparatus about the propeller shaft which, of course, is maintained stationary, the screws 5 are withdrawn from their holes 61, Fig. 1, and then the frame is bodily rotated to the desired position and screws 5 inserted in other holes 61. It will be understood that a series of circumferentially spaced holes 61 are provided so that the frame may be locked by screws 5 in any one of a number of predetermined angular positions. With the weights revolving, the vibrating force induced in the structure under test is transmitted to an oscillograph 62 diagrammatically indicated in Fig. 11, the induced force curve 65 being transmitted from any suitable pick-up diagrammatically indicated at 67 and located at any desired point on the structure under test. The force applied to the structure by the oscillator is indicated at 66. Now the cam 37, Fig. 6, will lift arm 41 once during each revolution to close contacts 40 whereupon, as diagrammatically illustrated in Figs. 10 and 12, the oscillograph 62 will produce a record 63 with impulses 64 made by the contacts 40 at given spaced points. When the pointer 60 is at zero, the contacts 40 cause the impulses to coincide with the peaks of this curve. The frequency and peaks of induced force curve 65 are directly comparable with the applied force, because the latter is known from the speed measured by the tachometer 32 and the position of the impulse marks on the record. All this appears from the oscillograph record. Curve 66, of course, is not recorded, but can be drawn in from the fact that it is a sine curve of known frequency and amplitude.

If visual comparison only is wanted contacts 40 can be shifted by angularly adjusting disc 44 until the impulse peaks and the peaks of curve 65 from the pickup coincide, at which point the scale 56, Fig. 1, on the case 55, Fig. 7, of the indicator shows the angular displacement between the applied and induced forces.

Thus there are two ways in which phase displacement can be determined: by taking a record and measuring it off on the oscillograph film or by watching the oscillograph screen and shifting the contacts until the peaks coincide and reading the angle from the scale. On the film the distance from one positive peak to another of curve 66 is 360 degrees.

From the foregoing disclosure it is seen that I have provided a very effective oscillator apparatus and phase indicating means for association therewith. The apparatus is relatively simple in construction, operation and maintenance and has a high degree of flexibility of operation and control, combined with ruggedness and accessibility of parts, without interfering or minimizing the effectiveness of the functional aspects of my apparatus.

It will of course be understood that various changes in construction and arrangement of parts may be made by those skilled in the art without departing from the spirit of the invention as set forth in the appended claims.

I claim:

1. An oscillator for producing vibrations in an airplane having a propeller shaft comprising, in combination, a cantilever frame adapted to be mounted upon the propeller shaft and freely projecting laterally from opposite sides thereof in a symmetrical manner, a plurality of rotatable vibration producing mechanisms symmetrically supported by the oppositely extending lateral portions of said frame and rotatable in a plane that intersects said shaft, means for rotating said vibration producing mechanisms, and means for maintaining said mechanisms in a predetermined relation to each other during operation thereof.

2. An oscillator for producing vibrations in an airplane having a propeller shaft comprising, in combination, a cantilever frame adapted to be mounted upon the propeller shaft and freely projecting axially from said shaft and laterally from opposite sides thereof in a symmetrical manner, a plurality of rotatable vibration producing mechanisms symmetrically supported by the oppositely extending lateral portions of said frame and rotatable in a plane that intersects said shaft, means for rotating said vibration producing mechanisms, and means for maintaining said mechanisms in a predetermined relation to each other during operation thereof.

3. An oscillator for producing vibrations in an airplane having a propeller shaft comprising, in combination, a cantilever frame adapted to be mounted upon the propeller shaft and freely projecting axially from said shaft and laterally from opposite sides thereof in a symmetrical manner, a plurality of rotatable vibration producing mechanisms symmetrically supported by the oppositely extending lateral portions of said frame and rotatable in a plane that intersects said shaft, means for rotating said vibration producing mechanisms, means for maintaining said mechanisms in a predetermined relation to each other during operation thereof, and means whereby said frame may be supported in different angular positions on the propeller shaft.

4. An oscillator comprising, in combination, a frame adapted to have one of its ends supported on a structure under test and its other end projecting freely therefrom, revolving weights journalled in said frame on axes extending in the direction in which said frame projects, and electric motors respectively driving said weights and supported in said frame with their axes extending in the same direction as the weight axes.

5. An oscillator comprising, in combination, a frame adapted to have one of its ends supported on a structure under test and its other end projecting freely therefrom, revolving weights journalled in said frame on axes extending in the direction in which said frame projects, electric motors respectively driving said weights and supported in said frame coaxial with the weight axes, and a shaft extending transversely of said motors and connected thereto by gearing to maintain a predetermined angular relation between said motors.

6. An oscillator apparatus for producing a vibration in a structure under test comprising, in combination, a frame adapted to be attached to the structure, vibration producing means supported by said frame, means for indicating the vibration induced in the structure under test by the action of said vibrating means, means for determining the phase relation between the applied vibration and the vibration induced in the structure, including electrical contacts periodically actuated in synchronism with the operation of said vibratory means, and means for shifting the position of said contacts until the actuation of the contacts synchronizes with the induced force curve.

7. The combination set forth in claim 6 further characterized in that the means for actuating said contacts includes a cam driven from said vibrating means and an arm for said contacts actuated by said cam.

8. An oscillator apparatus for producing a vibratory force in a structure under test comprising, in combination, a frame adapted to be attached to the structure, vibration producing means supported by said frame, means for indicating the vibration induced in the structure under test by the action of said vibrating means, means for determining the phase relation between the applied vibration and the vibration induced in the structure, including electrical contacts periodically actuated in synchronism with the operation of said vibratory means, said periodic actuating means including a cam driven from said vibrating means and an arm for said contacts actuated by said cam, and means for angularly bodily shifting both said contacts and said arm whereby the contacts may be actuated at any predetermined angular relation to the operation of said vibrating means.

9. An oscillator apparatus comprising, in combination, means for producing a vibration within a structure under test, an oscillograph for indicating the vibration induced in the structure under test, electrical means responsive to the operation of said vibrating means so as to operate in synchronism therewith, and means whereby the position at which said electrical means is responsive can be shifted until its response is synchronized with the induced vibration indicated by the oscillograph thereby determining the phase relation between the vibration applied by the vibrating mechanism and the resulting vibration in the structure.

10. An oscillator for producing vibrations in a shaft comprising, in combination, a frame element adapted to be mounted upon said shaft, a plurality of revolving eccentric weights supported by said frame element for rotation in a plane substantially traversing said shaft, a plurality of electric motors connected respectively at their inner ends to said weights, means for supporting said motors by said frame element in axial alignment with the weight axis, and transverse shafts and gearing connected to the outer end of said motors to maintain the same and said weights in a predetermined phase relation, whereby said revolving weights are adapted to transmit their vibrating force through said frame element directly to said shaft, said motor and transverse shaft projecting freely from said frame element as a cantilever.

11. The combination set forth in claim 10 further characterized in that said frame element has two radial recesses on opposite sides of the shaft axis and in which said weights are disposed, and shafts for said weights journalled in the walls on opposite sides of each recess.

12. The combination set forth in claim 10, further characterized in that said frame element has two radial recesses on opposite sides of the shaft axis and in which said weights are disposed, and shafts for said weights journalled in the walls on opposite sides of each recess so that said weights form a self-contained unit with said frame element, said motors having a separable connection with said weight shafts.

ORVILLE S. PETERS.